United States Patent
Jeffries et al.

(10) Patent No.: US 7,646,709 B2
(45) Date of Patent: *Jan. 12, 2010

(54) FLOW CONTROL IN COMPUTER NETWORKS

(75) Inventors: Clark Debs Jeffries, Durham, NC (US); Jitesh Ramachandran Nair, Kerala (IN); Michael Steven Siegel, Raleigh, NC (US); Rama Mohan Yedavalli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 11/560,088

(22) Filed: Nov. 15, 2006

(65) Prior Publication Data

US 2007/0076602 A1  Apr. 5, 2007

Related U.S. Application Data

(63) Continuation of application No. 10/160,507, filed on Jun. 3, 2002, now Pat. No. 7,224,670.

(51) Int. Cl.
*H04L 12/26* (2006.01)

(52) U.S. Cl. .................................. 370/229; 370/412
(58) Field of Classification Search ................. 370/229, 370/231, 235, 412, 252
See application file for complete search history.

(56) References Cited

U.S. PATENT DOCUMENTS

| | | | | |
|---|---|---|---|---|
| 6,654,343 | B1 * | 11/2003 | Brandis et al. | 370/229 |
| 6,992,980 | B2 * | 1/2006 | Brezzo et al. | 370/229 |
| 6,999,416 | B2 * | 2/2006 | Wang et al. | 370/230 |

* cited by examiner

*Primary Examiner*—Brian D Nguyen
(74) *Attorney, Agent, or Firm*—Mark E. McBurney; Schulbert Osterrieder & Nickelson PLLC (57) ABSTRACT

The decision within a packet processing device to transmit a newly arriving packet into a queue to await processing or to discard the same packet is made by a flow control method and system. The flow control is updated with a constant period determined by storage and flow rate limits. The update includes comparing current queue occupancy to thresholds and also comparing present queue occupancy to previous queue occupancy. The outcome of the update is a new transmit probability value. The value is stored for the subsequent period of flow control and packets arriving during that period are subject to a transmit or discard decision that uses that value.

20 Claims, 6 Drawing Sheets

FLOW CONTROL IN COMPUTER NETWORKS

This application is a continuation of U.S. application Ser. No. 10/160,507 filed 3 Jun. 2002 now U.S. Pat. No. 7,224,670.

CROSS REFERENCE TO RELATED PATENT APPLICATIONS

Patent application Ser. No. 10/161,000, filed on 3 Jun. 2002, assigned to the Assignee of the present invention and incorporated herein by reference describes a Flow Control System that discards Best Effort packets retroactively after occupancy in a queue with Premium packets.

FIELD

The present invention relates to congestion management in computer networks in general and, in particular, to manage flow control in response to congestion.

BACKGROUND

A switch is a network node that directs datagrams on the basis of Medium Access Control (MAC) addresses, that is, Layer 2 in the OSI model well known to those skilled in the art [see "The Basics Book of OSI and Network Management" by Motorola Codex from Addison-Wesley Publishing Company, Inc., 1993]. A switch can also be thought of as a multiport bridge, a bridge being a device that connects two LAN segments together and forwards packets on the basis of Layer 2 data. A router is a network node that directs datagrams on the basis of finding the longest prefix in a routing table of prefixes that matches the Internet Protocol (IP) destination addresses of a datagram, all within Layer 3 in the OSI model. A Network Interface Card (NIC) is a device that interfaces a network such as the Internet with an edge resource such as a server, cluster of servers, or server farm. A NIC might classify traffic in both directions for the purpose of fulfilling Service Level Agreements (SLAs) regarding Quality of Service (QoS). A NIC may also switch or route traffic in response to classification results and current congestion conditions.

Network processing in general entails examining packets and deciding what to do with them. This examination can be costly in terms of processing cycles, and traffic can arrive irregularly over time. Consequently, network nodes in general provide some amount of storage for packets awaiting processing. During episodes of congestion, some arriving packets might be purposefully discarded to avoid uncontrolled overrunning of the storage. This is flow control.

A common prior art flow control is called Random Early Detection (RED). As queue length grows from 0 to full storage capacity, RED at first transmits all packets into the queue, then, if occupancy exceeds a threshold Lo>=0%, a decreasing fraction of packets into the queue, and finally, if occupancy exceeds a threshold Hi<=100%, completely discarding all arriving packets. For queue occupancy Q that is between Lo and Hi, the fraction T of packets transmitted can be a linear function of the following form:

$$T(Q)=1-(1-Tmin)*(Q-Lo)/(Hi-Lo)$$

Here Tmin is a minimum transmitted fraction reached as Q increases to Hi. Many variations on this theme are practiced in the prior art; for example, Q might actually be an exponentially weighted moving average of queue occupancy.

The use of RED or its variants unfortunately can imply some undesirable consequences including:
1. Methods ignore rate of change (queue going up, down)
2. High thresholds can cause high latency
3. Low thresholds can cause burst-shaving (low utilization)
4. There is no direct relationship between thresholds and performance
5. Administrative input needed as offered loads change
6. Hand-tuning thresholds widely recognized as difficult
7. Little or no guidance in vendor documents.

In view of the above, more efficient apparatus and methods are required to make flow control decisions in high-speed networks.

SUMMARY OF THE INVENTION

The present invention describes a system and method for making intelligent, high-speed flow control decisions.

At discrete time intervals of length Dt, the value of a transmit probability T is refreshed. How it is refreshed is included in the present invention. As packets arrive at flow control during a time interval of duration Dt, the current value of T is compared to a random number. The flow control transmits the packet into the queue for subsequent processing if the value of T is greater than or equal to the value of the random number. Flow control discards the packet if the value of T is less than the random number.

The period of flow control update is denoted Dt. In a preferred embodiment, if the total capacity of the storage queue is denoted Qmax and if the maximum rate of flow of packets sent to or from the storage buffer is denoted S, then the time interval Dt is defined by Dt=Qmax/(8*S). As used in this document, the symbol * means multiplication. Therefore the maximum possible change in the occupancy of the queue in any time interval Dt is ⅛ of the queue storage capacity Qmax.

Denote queue occupancy Q at time t−Dt and at time t are as Q(t−Dt) and Q(t) respectively. Denote the value of the transmit probability T at time t as T(t). As an algorithm the present invention consists using inputs Q(t−Dt), Q(t), and T(t) to calculate the next transmit probability T(t+Dt).

The present invention includes calculation at time t the value T(t+Dt) of transmit probability to use during the time interval [t, t+Dt] by application of said algorithm. The inputs to the algorithm are the previous transmit probability T(t) used during the interval [t−Dt, t], the queue occupancy Q(t) at time t, and the queue occupancy Q(t−Dt) at time t−Dt. Details are given below.

In essence a current transmit probability T(t) is a function of past queue occupancy Q(t), current queue occupancy and past transmit probability.

A summary of constants appearing in the invention follows:
S the maximum possible input or output rate to the storage queue
Qmax the maximum capacity of the queue
Dt the flow control time interval; in a preferred embodiment, Dt=Qmax/(8*S)
Q0 a low queue threshold; in a preferred embodiment, Q0=Qmax/8
Q1 a high queue threshold; in a preferred embodiment, Q1=3*Qmax/8
K0 a moderate rate of transmit probability exponential decay; in a preferred embodiment, K0=³¹/₃₂
K1 a high rate of transmit probability exponential decay; in a preferred embodiment, K1=¾

Inc0 a rate of linear increase; in a preferred embodiment, Inc0=1/128

Inc1 a rate of linear increase; in a preferred embodiment, Inc1=1/128

A summary of variables appearing in the invention follows:

T(t) the transmit probability enforced in the time interval [t, t+Dt]; the value T(t) must be stored for use in the calculation of T(t+Dt).

Q(t) the queue occupancy (i.e. Length of queue measured in packets, bits, etc.) at time t; the value Q(t) is used in the calculation of T(t) and must also be stored for use in the calculation of T(t+Dt).

The present invention includes the use of the following algorithm with steps to update transmit probability T(t).

1. Determining Q(t).
2. If Q(t) is less than a low threshold denoted Q0, then T(t+Dt)=minimum {1, T(t)+Inc0} where Inc0 is an increment constant greater than 0 and less than 1. In a preferred embodiment, the value of the low threshold is ⅛ of total queue capacity and the value of Inc0 is 1/128.
3. Else, if Q(t) is above a high threshold denoted Q1, then T(t+Dt)=K0*T(t) where K0 is a constant greater than 0 and less than 1. In a preferred embodiment, the value of the high threshold is ⅜ of the maximum queue capacity, and the value of K0 is ¾. In an alternative embodiment, 0<Q0=Q1<Qmax.
4. Else, if Q(t) is greater than or equal to Q(t−Dt), then T(t+Dt)=K1*T(t) where K1 is a constant greater than K0 and less than 1. In a preferred embodiment, the value of K1 is 31/32.
5. Else, T(t+Dt)=minimum {1, T(t)+Inc1} where Inc1 is an increment constant greater than 0 and less than 1. In a preferred embodiment, the value of Inc1 is the same as Inc0, namely, 1/128.

Thus the present invention can differentiate between a first scenario in which queue value is moderate (between Q0 and Q1) and constant or increasing and a second scenario in which queue value is moderate and decreasing.

The present invention includes use of control theory in place of intuitive methods. For the special case of constant input to the queue and constant service rate from the queue, this enables complete characterization of equilibrium states, meaning states at which the transmit probability has reached a value such that queue occupancy is constant. If the value of Q is constant, then Q(t−Dt)=Q(t). It can be shown that such constant input and service rates will lead to one of the following equilibrium states.

1. If the input rate is less than the service rate, then at the equilibrium state Q(t−Dt)=Q(t)=0.
2. If the input rate is greater than the service rate by a factor of up to about 4, then at the equilibrium state Q(t−Dt)=Q(t)=Q0, the lower queue threshold. In a preferred embodiment, Q0 is ⅛ of the storage capacity of the queue.
3. If the input rate is greater than about four times the service rate and the service rate is still positive, then at the equilibrium state Q(t−Dt)=Q(t)=Q1, the upper queue threshold. In a preferred embodiment, Q1 is ⅜ of the storage capacity of the queue.
4. If the service rate is zero and the input rate is positive, then the queue approaches an equilibrium state Q(t−Dt)=Q(t) that is less than the storage capacity of the queue. In a preferred embodiment with Q1=3*Qmax/8 and K0=¾, the equilibrium state is at most about Q1+(Qmax/8)*(1/(1−K0))=7*Qmax/8, that is, ⅞ of the storage capacity of the queue.

DETAILED DESCRIPTION

Figure 1:
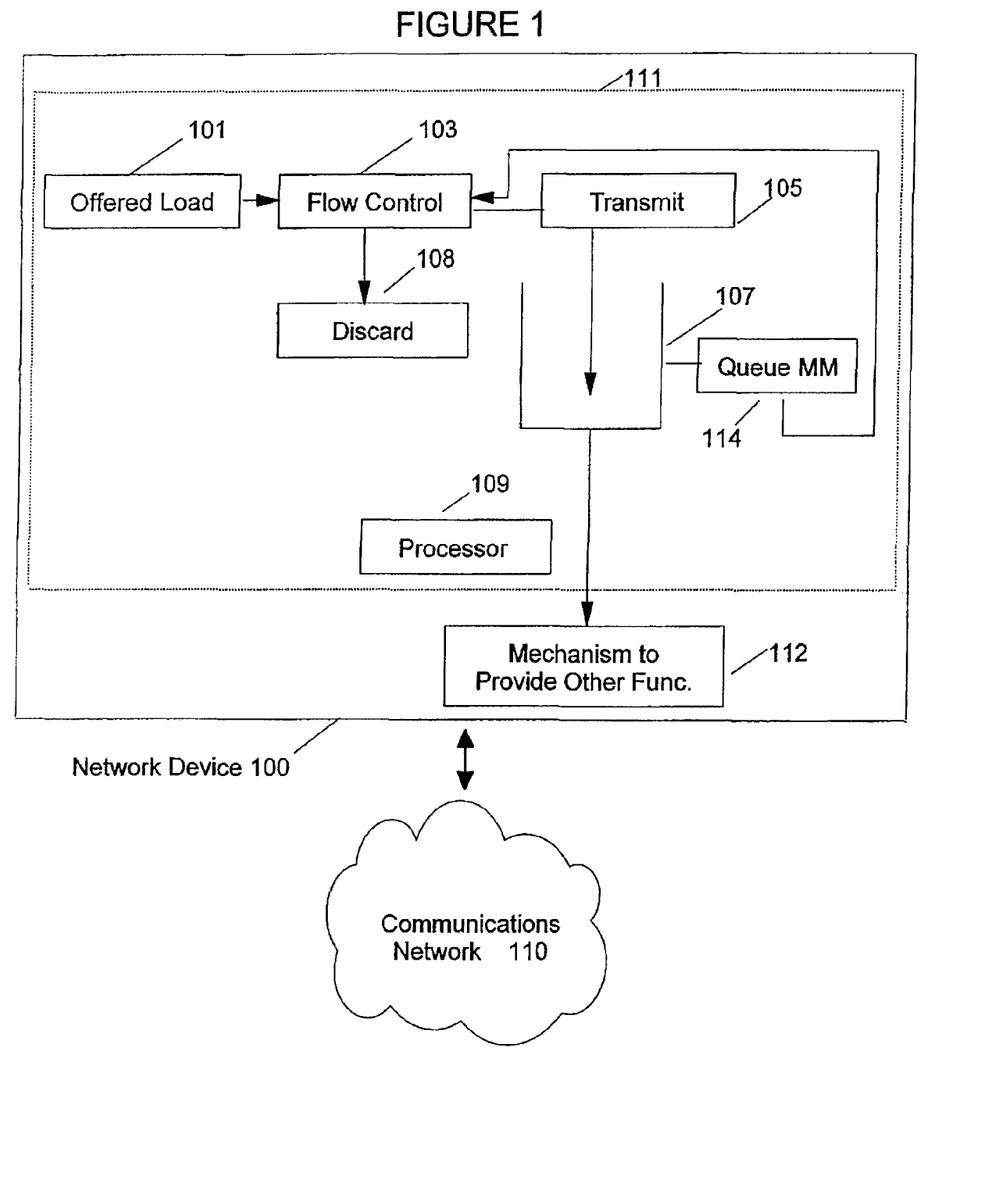
FIG. 1 shows a flow control in accordance with the teaching of the present invention that limits the occupancy of a queue by discarding, if necessary, some packets rather than transmitting them into the queue.

Referring to FIG. 1, the invention specifies a flow control method provided in a network device sometimes called a node or communications system 100 coupled to communications network 110 which shall be public switch network, internet, private network, etc., or any combination of the named network. The network device 100 could be a router, switch, Network Interface Card (NIC) or more generally a machine capable of both switching and routing functions based upon classification results and current congestion conditions. The switching and routing functions may be carried out by a Network Processor chip, such as PowerNP NP4GS3 manufactured by IBM® Corporation, operatively mounted in the machine. As is well known, network devices typically use computer program products comprising computer executable program code such as firmware on a computer readable medium such as memory to implement such functions. The flow control mechanism to which the present invention relates is identified by numeral 111 whereas mechanisms providing the other functions (such as classification routing, etc.) are collectively represented by the block labeled 112. Because the mechanisms that perform the other functions are not part of the present invention further reference to them will not be made.

Still referring to FIG. 1 traffic enters with an offered load 101. Flow control 103 must decide for each packet whether to transmit the packet 105 into a queue 107 or to discard the packet 108. Packets transmitted into the queue 107 are subsequently processed 109. Queue monitoring mechanism (Queue MM) 114 monitors queue status and forwards information to the flow control 103. Queue status, such as length of queue, can be measured in several ways. For example, sensors (not shown) can be positioned at selected locations on the queue to output signals when queue level reaches the position of the sensor. Another technique counts packets or frames as they enter the queue. These and other monitoring techniques are known in the prior art and will not be discussed further.

Figure 2:
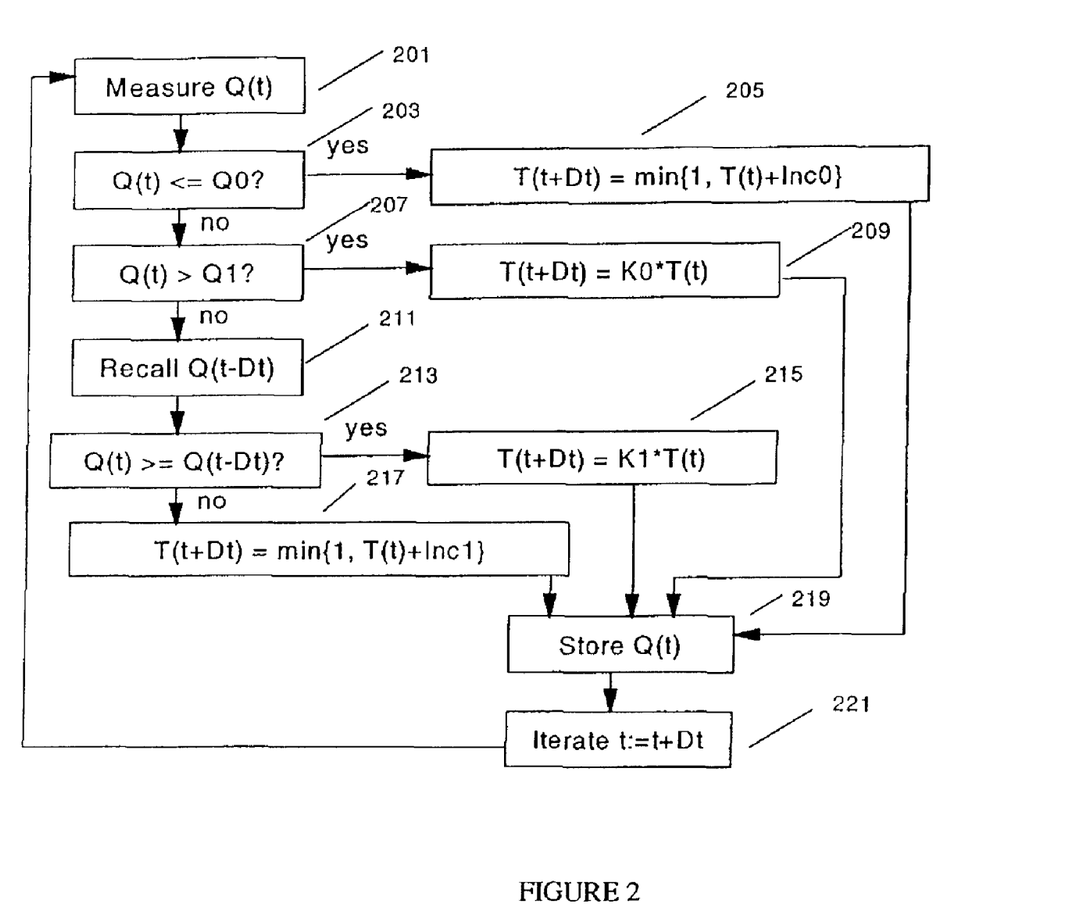
FIG. 2 shows a flow chart for updating flow control transmit probability T(t) to obtain transmit probability T(t+Dt).

Referring to FIG. 2, a flowchart for updating the transmit probability from T(t) to T(t+Dt) is presented. The update of old time t to current time t is designated by the symbol :=, meaning the new value of t is derived from the previous value of t by a formula t+Dt. With period Dt, first the queue occupancy Q(t) at time t is measured 201. The value of Q(t) is compared 203 to a threshold Q0. If Q(t) is less than or equal to Q0, then T is updated by a linear increase 205. If Q(t) is greater than Q0, then Q(t) is compared 207 to a second threshold Q1. If Q(t) is greater than Q1, then T is updated by an exponential decrease 209. If Q(t) is less than or equal to Q1, then Q(t−Dt) is recalled 211. Then Q(t) is compared to Q(t−Dt) 213. If Q(t) is greater than or equal to Q(t−Dt), then T is updated by an exponential decrease 215. If Q(t) is less than Q(t−Dt), then T is updated by a linear increase 217. In all cases, the value of Q(t) is then stored 219. The value of t is iterated by Dt 221. Then the update of T begins anew 201.

Figure 3:
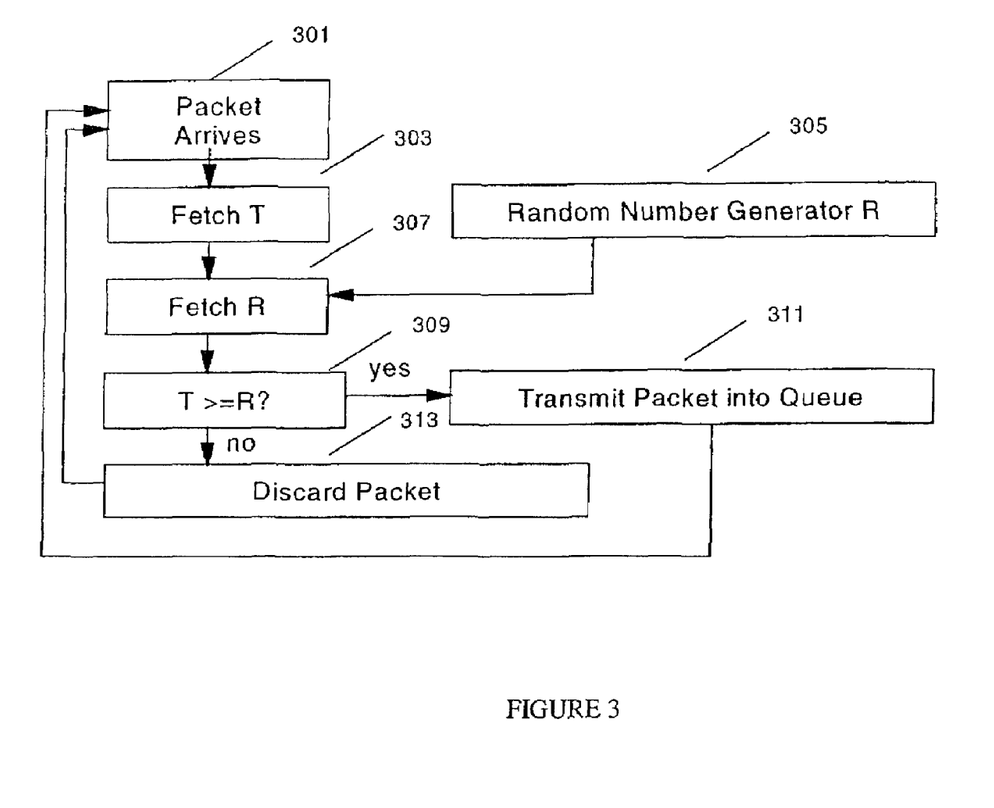
FIG. 3 shows a flow chart for making a decision to transmit or discard a packet.

Referring to FIG. 3, a flowchart for making a decision to transmit or discard a packet is presented. First a packet arrives 301. The current value of the transmit probability T is fetched 303. A fresh random number R is generated by a random number generator 305. The value of R is fetched 307. T and R are compared 309. If T is greater than or equal to R, then the packet is transmitted into the queue 311. If T is less than R, then the packet is discarded. In either case, the system recycles to 301 as a new packet arrives.

Figure 4:
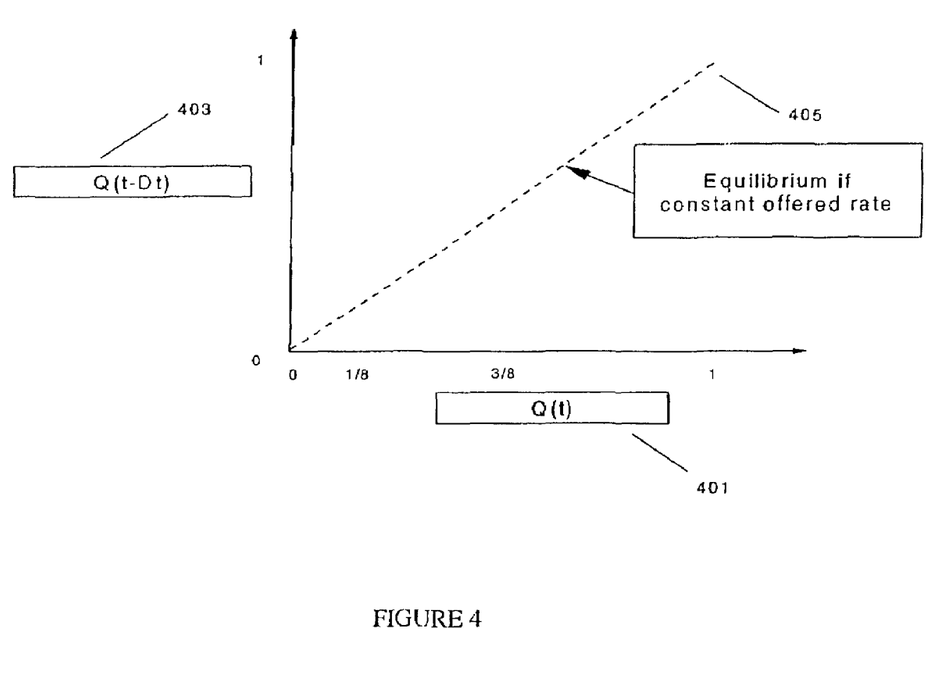
FIG. 4 shows a two-dimensional graph that is useful in presentation of the present invention. The horizontal axis is the value of the present queue occupancy Q(t) of the system. The vertical axis is the value of the previous queue occupancy Q(t−Dt). The dashed line in FIG. 4 denotes the state that Q(t)=Q(t−Dt). In equilibrium the value of Q is constant, so the state of the system will be during equilibrium somewhere on the dashed line.

Referring to FIG. 4, a state space with two axes is presented. The axes are the current queue occupancy value Q(t) 401 and the previous queue occupancy value Q(t−Dt) 403. At equilibrium with constant offered load and service rate, Q(t) =Q(t−Dt). The general equilibrium condition is the dashed line 405.

Figure 5:
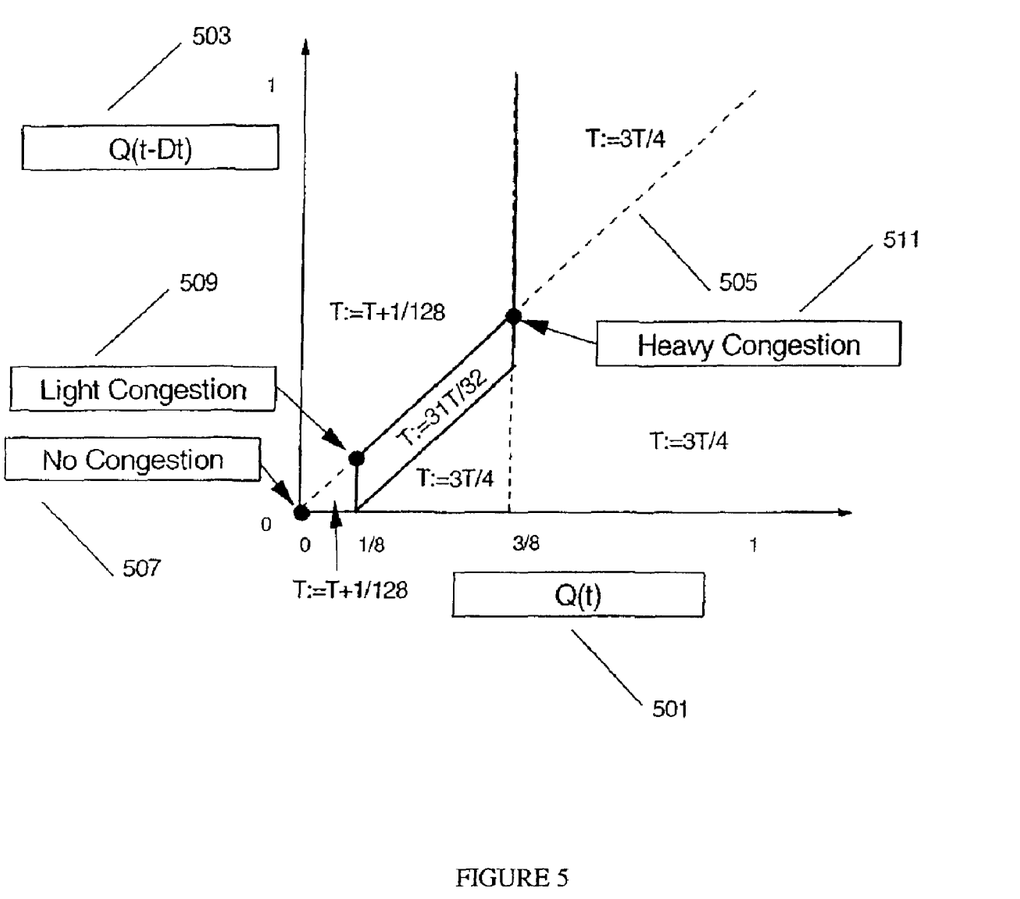
FIG. 5 shows regions of two-dimensional space with axes again representing the present queue occupancy Q(t) and the previous queue occupancy Q(t−Dt). In different regions of this space, different rules for updating T are applied. The update functions are in accordance with the teaching of the present invention. Furthermore, along the equilibrium line with Q(t)=Q(t−Dt) three distinguished equilibria are shown.

Referring to FIG. 5, three special equilibrium states in the state space of FIG. 4 are detailed. Values selected for this figure are as in the preferred embodiment. Again the present queue occupancy Q(t) 501, the previous queue occupancy Q(t−Dt) 503, the general equilibrium condition 505 are shown. Within different regions of the graph, different formulas are used to update the transmit probability T. Note again the use of := to designate the update, that is, deriving the new value of T from the old. During no congestion, the equilibrium state is (0, 0) 507. During light congestion, the equilibrium state is ($\frac{1}{8}$, $\frac{1}{8}$) 507 if maximum queue capacity Qmax is normalized to 1. During heavy congestion, the equilibrium state is ($\frac{3}{8}$, $\frac{3}{8}$) 511 if maximum queue capacity Qmax is normalized to 1. If service rate is reduced to zero, then the equilibrium state can be anywhere on the line 505 up to ($\frac{7}{8}$, $\frac{7}{8}$).

Figure 6A:
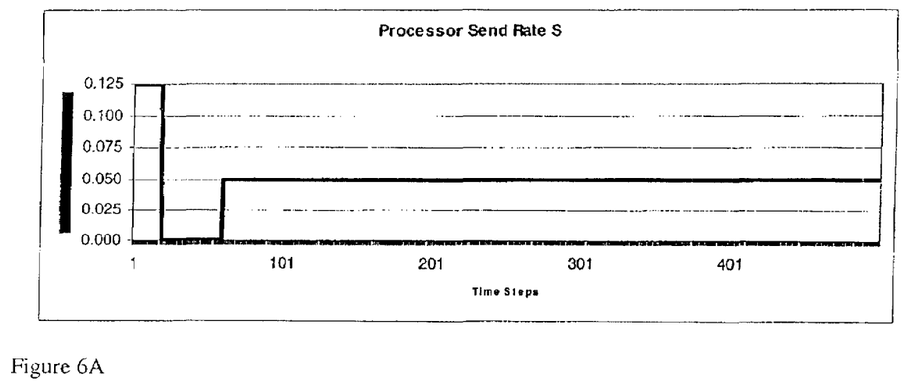
FIGS. 6A, 6B, and 6C show performance of the invention over 500 time steps each equal to Dt. The graphs are actual outputs of a system modeled according to teachings of the present invention.
Figure 6B:
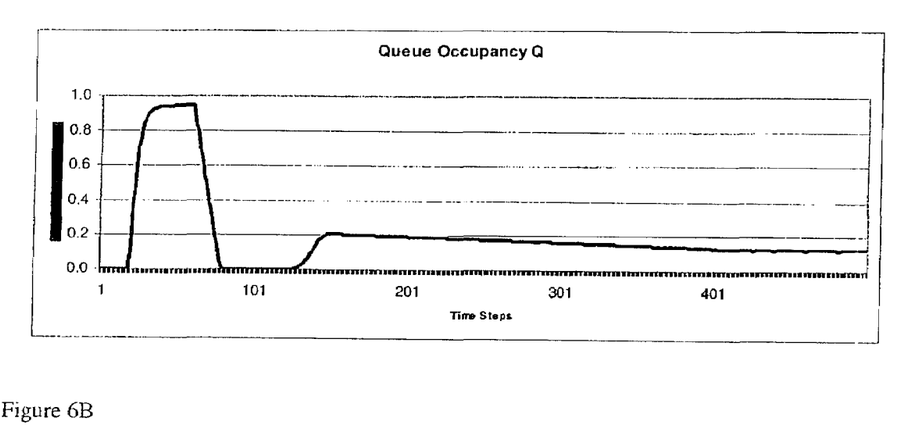
Figure 6C:
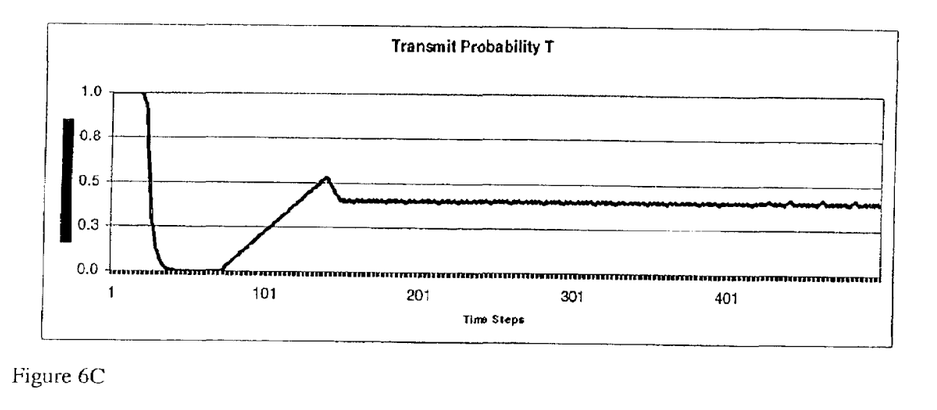

Referring to FIGS. 6A, 6B and 6C, performance graphs are presented. In FIG. 6A the queue processor service rate S is specified in the experiment for 500 time steps each equal to Dt. At first the value of S is the full drain rate $\frac{1}{8}$, following from the choice of Dt in the preferred embodiment. Queue occupancy in FIG. 6B is zero. The transmit probability in FIG. 6C is 1. Then S is suddenly reduced to zero at approximately the twentieth time step. Queue occupancy in FIG. 6B rises to about $\frac{7}{8}$ in normalized units so that Qmax=1. The transmit probability in FIG. 6C falls to nearly zero. Then at about the seventieth time step, the service rate is suddenly increased to 0.05, that is, 0.05/0.125=0.4 times the constant offered rate of 0.125. This is shown in FIG. 6A. As shown in FIG. 6B, the queue to nearly 0, then increases to $\frac{1}{8}$, then value of Q0 in the preferred embodiment. The value of T in FIG. 6C rises and eventually reaches an equilibrium of about 0.4, as it must due to the overload ratio.

In summary, the traffic enters the system at a constant rate equal to Qmax/(8*Dt). FIG. 6A depicts a variable processor send rate S (chosen to illustrate the response of the invention). For about 20 time steps the value of S is the same as the input rate, namely, $\frac{1}{8}$=0.125 of the queue capacity. Therefore the system transmits all packets into the queue. The packets are processed as soon as they arrive and the queue stays empty. Then the rate S falls to 0 for about 50 additional time steps. Then the rate S becomes 0.050 for the remainder of the time steps. FIG. 6B depicts the resulting queue occupancy Q. At first it is zero, then it rises to a maximum value of about $\frac{7}{8}$=0.875, then it falls to a long-term equilibrium value of about $\frac{1}{8}$=0.125. FIG. 6C depicts the value of the transmit probability T. At first it is 1, then it falls to nearly 0 (indistinguishable on the graph from 0), then it rises to a long-term equilibrium value of about 0.40.

In a preferred embodiment, if the total capacity of the storage queue is denoted Qmax and if the maximum rate of flow into or from the storage buffer is S, then a time interval Dt for updating the flow control is, in a preferred embodiment, defined by Dt=Qmax/(8*S). Denote queue occupancy Q at time t−Dt and at time t as Q(t−Dt) and Q(t) respectively. Furthermore, the value of the transmit probability T at time t, that is, T(t) is used. As an algorithm the present invention includes using inputs Q(t−Dt), Q(t), and T(t) to calculate the next transmit probability T(t+Dt) by use of the following steps:

1. If Q(t) is less than a low threshold denoted Q0, then T(t+Dt)=minimum {1, T(t)+Inc0} where Inc0 is an increment constant greater than 0 and less than 1. In a preferred embodiment, the value of the low threshold is $\frac{1}{8}$ of total queue capacity and the value of Inc0 is $\frac{1}{128}$.
2. Else, if Q(t) is above a high threshold denoted Q1, then T(t+Dt)=K0*T(t) where K0 is a constant greater than 0 and less than 1. In a preferred embodiment, the value of the high threshold is $\frac{3}{8}$ of the maximum queue capacity, and the value of K0 is $\frac{3}{4}$.
3. Else, if Q(t)>=Q(t+Dt), then T(t+Dt)=K1*T(t) where K1 is a constant greater than K0 and less than 1. In a preferred embodiment, the value of K1 is $\frac{31}{32}$.
4. Else, T(t+Dt)=minimum {1, T(t)+Inc1} where Inc1 is an increment constant greater than 0 and less than 1. In a preferred embodiment, the value of Inc1 is the same as Inc0, namely, $\frac{1}{128}$ The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method comprising:
   generating, by a network device, a transmit probability T(t) and determining a period Dt to update the transmit probability T(t);
   determining, by the network device, a queue occupancy Q(t−Dt) and Q(t) of a queue and the T(t) periodically at certain time values;
   comparing, by the network device, the queue occupancy Q(t) with two preselected constant thresholds, a Q0 and a Q1, having the relationship 0<Q0<Q1<Qmax where Qmax is the maximum storage capacity of the queue; and using, by the network device, the values $Q(t-Dt)$, $Q(t)$, $T(t)$ and comparisons to compute a subsequent transmit probability $T(t+Dt)$.

2. The method according to claim 1, further comprising:
providing a random number generator;
upon arrival of a packet in the time interval $[t, Dt]$, performing a comparison of a random number value of said random number generator with a transmit probability $T(t+Dt)$;
discarding said packet if the random number value of said random number generator is greater than the transmit probability $T(t+Dt)$; and
transmitting said packet into a storage queue if the random number value of said random number generator is less than or equal to said transmit probability $T(t+Dt)$.

3. The method according to claim 2, wherein said random number value and said transmit probability $T(t+Dt)$ are both fractions between 0 and 1.0, that is, in the interval of fractions in $[0, 1]$.

4. The method according to claim 1, wherein updating the value of the transmit probability $T(t)$ is determined by an algorithm based upon queue occupancy and rate of change of queue occupancy.

5. The method according to claim 1 wherein the period for updating the transmit probability is a small fraction of a fraction $Qmax/S$ where $Qmax$ is maximum queue capacity and S is the highest possible rate at which the queue could be filled or drained.

6. The method of claim 5, wherein the period for updating the transmit probability is about $1/8$ of the fraction $Qmax/S$.

7. The method of claim 5, wherein the period for refreshing the transmit probability is about $1/8$ of $Qmax/S$.

8. The method according to claim 1, wherein $Q0=Qmax/8$ and, if queue occupancy $Q(t)$ is less than or equal to $Q0$, updating the transmit probability by a linear increase by a constant up to a limiting value of 1.

9. The method of claim 8, wherein generating a transmit probability further comprises determining if $Q(t)$ is less than or equal to $Q0$, and if so, updating the transmit probability by a linear increase by a constant of about $1/128$.

10. The method according to claim 1, wherein $Q0=Qmax/8$ and, if $Q(t)$ is greater than $Q0$, comparing the length of the queue to the threshold $Q1$ that is greater than or equal to $Q0$ and, if greater than $Q1$, updating the transmit probability by an exponential decrease by a constant multiplier.

11. The method of claim 10, wherein $Q0$ is about equal to $Q1-3*Qmax/8$.

12. The method of claim 10, wherein the constant multiplier is substantially $3/4$.

13. The method according to claim 1, further comprising measuring the packets in said queue and comparing a result to a relatively low threshold $Q0$ and a relatively high threshold $Q1$ and, if the result is greater than $Q0$ yet less than or equal to $Q1$, comparing present queue occupancy to previous queue occupancy and, if present queue occupancy is greater than or equal to previous queue occupancy, updating the transmit probability by an exponential decrease by a constant multiplier or if present queue occupancy is less than previous queue occupancy, updating the transmit probability by a linear increase by a constant up to a limiting value of 1.

14. The method of claim 1, wherein $Q0$ is less than or substantially equal to $Qmax/8$.

15. The method of claim 1, wherein $Q1$ is greater than or substantially equal to $3Qmax/8$.

16. A computer program product for updating a transmit probability $T(t)$, the computer program product comprising: a computer readable medium having computer executable program code embodied therewith, the computer executable program code comprising: computer executable program code configured to compare a value $Q(t)$ representing queue occupancy, during a period $Dt$ for updating a transmit probability $T(t)$ and a subsequent transmit probability $T(t+Dt)$, with a first threshold $Q(0)$ and a second threshold $Q(1)$; if $Q(t)$ is less than a low threshold denoted $Q0$, $T(t+Dt)$=minimum $\{1, T(t)+Inc0\}$ where $Inc0$ is an increment constant greater than 0 and less than 1, Else, if $Q(t)$ is above a high threshold denoted $Q1$, $T(t+Dt)=K0*T(t)$ where $K0$ is a constant greater than 0 and less than 1, Else, if $Q(t)$ is greater than or equal to $Q(t-Dt)$, $T(t+Dt)=K1*T(t)$ where $K1$ is a constant greater than $K0$ and less than 1, Else, $T(t+Dt)$=minimum $\{1, T(t)+Inc1\}$ where $Inc1$ is an increment constant greater than 0 and less than 1.

17. The program product of claim 16, wherein the low threshold is about $1/8$ of total queue capacity and the value of $Inc0$ is about $1/128$.

18. The program product of claim 16, wherein the value of the high threshold is about $3/8$ of a maximum queue capacity, and the value of $K0$ is about $3/4$.

19. The program product of claim 16, wherein the value of $K1$ is about $31/32$.

20. The program product of claim 16, wherein the value of $Inc1$ is about $1/128$.

* * * * *

UNITED STATES PATENT AND TRADEMARK OFFICE
CERTIFICATE OF CORRECTION

| | |
|---|---|
| PATENT NO. | : 7,646,709 B2 |
| APPLICATION NO. | : 11/560088 |
| DATED | : January 12, 2010 |
| INVENTOR(S) | : Jeffries et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 318 days.

Signed and Sealed this

Sixteenth Day of November, 2010

David J. Kappos
*Director of the United States Patent and Trademark Office*